United States Patent [19]
Yoshida et al.

[11] Patent Number: 5,754,007
[45] Date of Patent: May 19, 1998

[54] METHOD OF DEGAUSSING CATHODE RAY TUBE

[75] Inventors: Akihiko Yoshida; Toshihiro Ito, both of Aichi, Japan

[73] Assignee: Sony Corporation, Japan

[21] Appl. No.: 660,104

[22] Filed: Jun. 7, 1996

[30]   Foreign Application Priority Data

Jun. 14, 1995   [JP]   Japan ..................... 7-146983

[51] Int. Cl.$^6$ ................................... H01J 29/06
[52] U.S. Cl. ................................... 315/8
[58] Field of Search ........................... 315/8, 370

[56]              References Cited
              U.S. PATENT DOCUMENTS

| 3,588,583 | 6/1971 | Ciecierski | 315/8 |
| 4,963,789 | 10/1990 | Buhler | 315/8 |

FOREIGN PATENT DOCUMENTS

| 197 580 | 10/1986 | European Pat. Off. . |
| 57-162238 | 10/1982 | Japan . |
| 62-290034 | 12/1987 | Japan . |
| 62-290034 | 5/1988 | Japan . |
| 6-223724 | 8/1994 | Japan . |
| 6-284435 | 10/1994 | Japan . |
| 6-223724 | 11/1994 | Japan . |

OTHER PUBLICATIONS

Buhler, Frederick T., "Preserving Shadow–Mask CRT Perforance in Strong Magnetic Fields" SID 91 Digest, 1991, pp. 890–893.

*Primary Examiner*—Robert Pascal
*Assistant Examiner*—Michael Shingleton
*Attorney, Agent, or Firm*—Ronald P. Kananen

[57]              ABSTRACT

A method of degaussing a cathode ray tube where two pairs of degaussing coils are arranged with one pair located at the top and bottom and the other to the right and left of the cathode ray tube after impaired color purity correction process of an electron beam has been carried out for the cathode ray tube using a magnetization process with a magnetization including an anticipated amount of degaussing for the cathode ray tube when the cathode ray tube is incorporated in a display device. The degaussing of a magnetic material within the cathode ray tube is then carried out with the anticipated amount of degaussing using the degaussing coils. In this way, a color cathode ray tub with no impaired color purity can be provided because the cathode ray trajectories corrected by magnetization in the magnetization process is not easily changed during use after incorporation in the display device.

8 Claims, 6 Drawing Sheets

METHOD OF DEGAUSSING CATHODE RAY TUBE

BACKGROUND OF THE INVENTION

The present invention relates to a method of degaussing a cathode ray tube and more particularly to a method of degaussing in a manufacturing process for a trinitron (registered trademark) method color cathode ray tube.

Color cathode ray tubes are constructed in such a manner that three cathode rays of red green and blue, three electron beams, respectively land at corresponding fluorescent materials at a fluorescent surface at the inner surface of a fluorescent glass panel. However, if shifts occur in the landing position of the cathode rays with respect to the fluorescent material, color purity is impaired due to the landing errors. The spaces between each of the fluorescent materials of the fluorescent surface are therefore filled with a black non-light-emitting material of carbon. This carbon therefore gives an allowance with regards to the cathode ray landing and an improvement in the color purity can be achieved.

In color cathode ray tube manufacturing processes, thermal deformation of the color discriminating electrodes or the glass tube of the cathode ray tube, distortion of the glass tube when the tube is evacuated to be sealed, mechanical shifts in the position of the color discriminating electrodes, or magnetization during manufacturing processes such as welding of the color discriminating electrodes sometimes cause the landing position of the cathode ray at the fluorescent surface to shift from the target position. Usually, when the landing position of the cathode rays shifts from the target position, the desired picture quality cannot be obtained because color purity is impaired or brightness reduction occurs.

In order to correct shifting of the landing position of the cathode rays at the fluorescent surface from the target position, a method is well known as described in Japanese Patent Laid-Open Publication Sho. 62-290034. As set forth in this document, an attenuating alternating magnetic field is applied by a degaussing coil with a direct current, hereinafter referred to as "d.c.", biased magnetic field being applied to the completed cathode ray tube by a ring coil surrounding the region of the color discriminating electrodes of the cathode ray tube. As a result, the color discriminating electrodes become magnetized and the trajectory of the cathode rays are changed. Further, shapes and arrangements for the static biased magnetic field generating coils and the attenuating alternating magnetic field generating coils have also been proposed, as discussed in Japanese Patent Laid-Open Publication Hei. 6-223724, so that the color discriminating electrodes can be successfully magnetized.

However, when, as described above, impaired color purity due to the problem of landing position of the cathode ray at the fluorescent surface shifted from the target position is corrected as a result of magnetizing a magnetic material, color discrimination electrodes, etc., within the cathode ray tube by applying a d.c. biased magnetic field superimposed on a strong attenuating alternating magnetic field, and the completed cathode ray tube is incorporated into a display device such as a computer display, a television, or a monitor etc., the magnetic material is degaussed due to a degaussing device built-into the display device or due to degaussing in manufacturing or adjustment processes of the display device. This degaussing sometimes causes color changes during use because the amount of impaired color purity correction due to magnetization becomes small.

Figure 1:
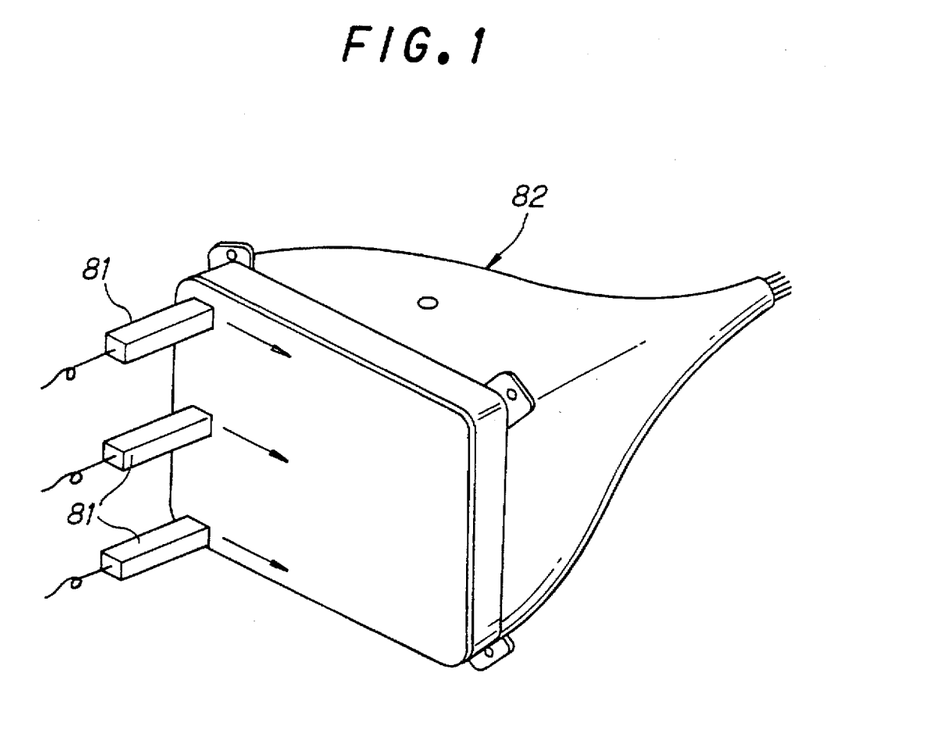
FIG. 1 is a perspective view showing an example of related art employing a degaussing rod.

With regards to this problem, as shown in FIG. 1, a magnetic field for the degaussing due to a degaussing device built-into a display device and the degaussing during manufacture and adjustments was imitated by scanning the front surface of a cathode ray tube 82 a number of times with a degaussing rod, such as HOZAN HC-21 (trademark), 81 used in adjusting the display device after impaired color purity correction magnetization has been carried out so that the magnetization includes the anticipated amount of the degaussing. However, with the degaussing using a degaussing rod 81, so-called rod degaussing, the magnetic flux from the degaussing rod does not sufficiently pass through the internal magnetizing shield (IMS) provided at the rear side within the cathode ray tube. Degaussing due to the degaussing device built-into the display device and degaussing at the time of manufacture and adjustment can therefore not be sufficiently imitated by this method. This mismatch then causes the amount of degaussing for color purity adjustment to change.

In order to resolve the aforementioned problems, it is an object of the present invention to provide a method of degaussing a cathode ray tube where degaussing due to a degaussing device built-into the display device for a magnetic material within the cathode ray tube and degaussing at the time of manufacture and adjustment can be sufficiently imitated and degaussing can be carried out.

SUMMARY OF THE INVENTION

In order to achieve the aforementioned object, according to the degaussing method of the present invention, two pairs of degaussing coils are arranged, with one located at the top and bottom and the other to the left and right of the cathode ray tube. Impaired color purity correction process of an electron beam is carried out for the cathode ray tube by a magnetization process with a magnetization including an anticipated amount of degaussing when the cathode ray tube is incorporated in a display device. The degaussing of a magnetic material within the cathode ray tube is then carried out with the anticipated amount of degaussing using the degaussing coils.

In this manufacturing process for a cathode ray tube, two pairs of degaussing coils are provided, with one located at the top and bottom and the other to the left and right of a cathode ray tube. Magnetizing is carried out using a d.c. biased magnetic field and an attenuating alternating magnetic field with inclusion of an anticipated amount of the degaussing due to a degaussing device built into the display device into which the cathode ray tube is to be incorporated into and the degaussing during manufacture and adjustment. Degaussing of a magnetic material within the cathode ray tube is then be carried out by giving a magnetic flux corresponding to the above anticipated amount of degaussing provided by magnetomotive forces due to these degaussing coils.

BRIEF DESCRIPTION OF THE DRAWINGS

FIG. 8A is a perspective view and FIG. 8B is a plan view.

DETAILED DESCRIPTION OF THE PREFERRED EMBODIMENTS

The following is a detailed description of an embodiment of the present invention with reference to the drawings.

Figure 2:
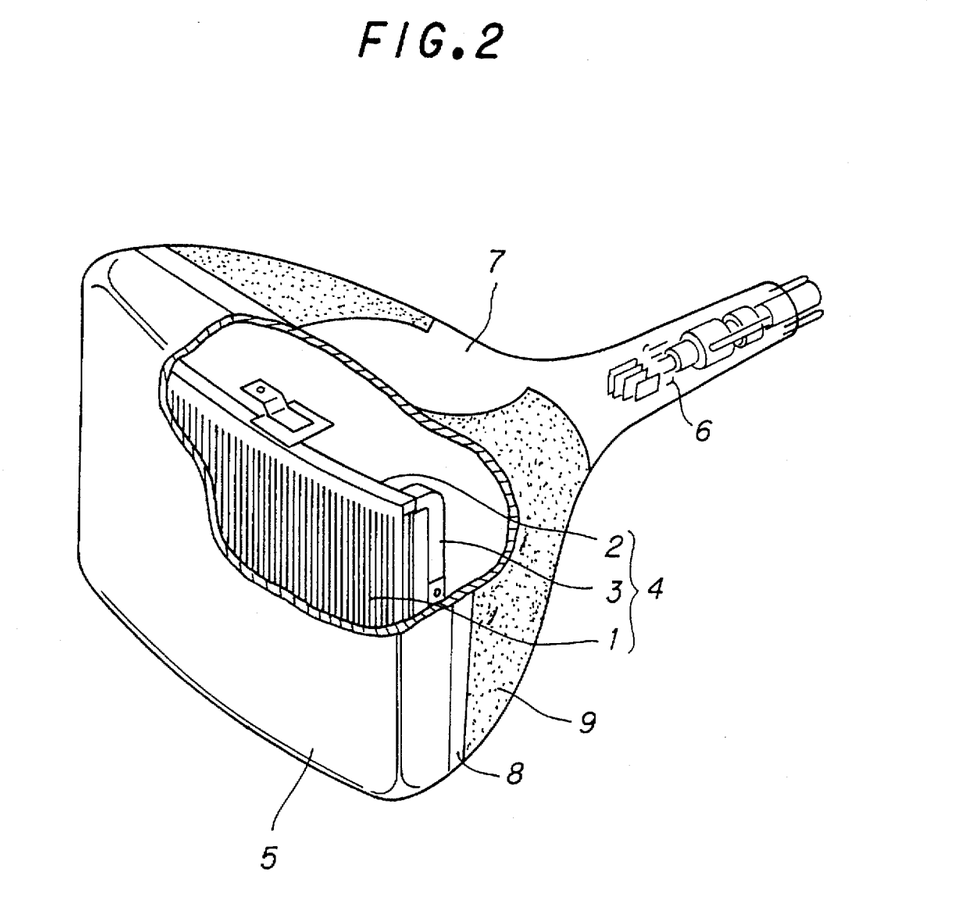
FIG. 2 is a partially cut-away view in perspective showing a trinitron method cathode ray tube to which the degaussing method of the present invention is applied.

FIG. 2 is a partially cut-away view in perspective showing a trinitron method cathode ray tube 13 to which the degaussing method of the present invention is applied. As shown in FIG. 2, the trinitron method cathode ray tube 13 comprises a rattan blind-shaped aperture grill (AG) 1, a color discriminating electrode 4 comprising an AG frame A-member 2 for supporting this aperture grill 1 and an AG frame B member 3, a fluorescent glass panel 5 formed with fluorescent stripes and an electron gun hermetically sealed within a funnel 7. The fluorescent glass panel 5 and the funnel 7 are connected via a frit seal 8. An internal magnetic shield (IMS) 9 is provided within the funnel 7 in order to prevent influences of the geomagnetism, etc. Magnetic material of iron group is generally used as main constituent material of these structures.

With this kind of cathode ray tube, in the manufacturing processes, magnetization of magnetic materials in the tube is carried out using a d.c. biased magnetic field and an attenuating alternating magnetic field for correcting shifts in the landing position of cathode rays at the fluorescent surface from a target position occurring due to thermal deformation in the color discriminating electrodes 4 or glass tube, deformation of the glass tube caused by evacuation, mechanical shifts in position of the color discriminating electrodes 4, or magnetization during manufacturing processes such as welding of the color selection electrodes 4. Further, degaussing imitating degaussing due to a degaussing device built-into a display device into which the completed cathode ray tube is to be incorporated and degaussing during manufacturing and adjustment is carried out after impaired color purity correction of electron beam using this magnetization process. The present invention relates to the degaussing method during this degaussing.

Figure 3:
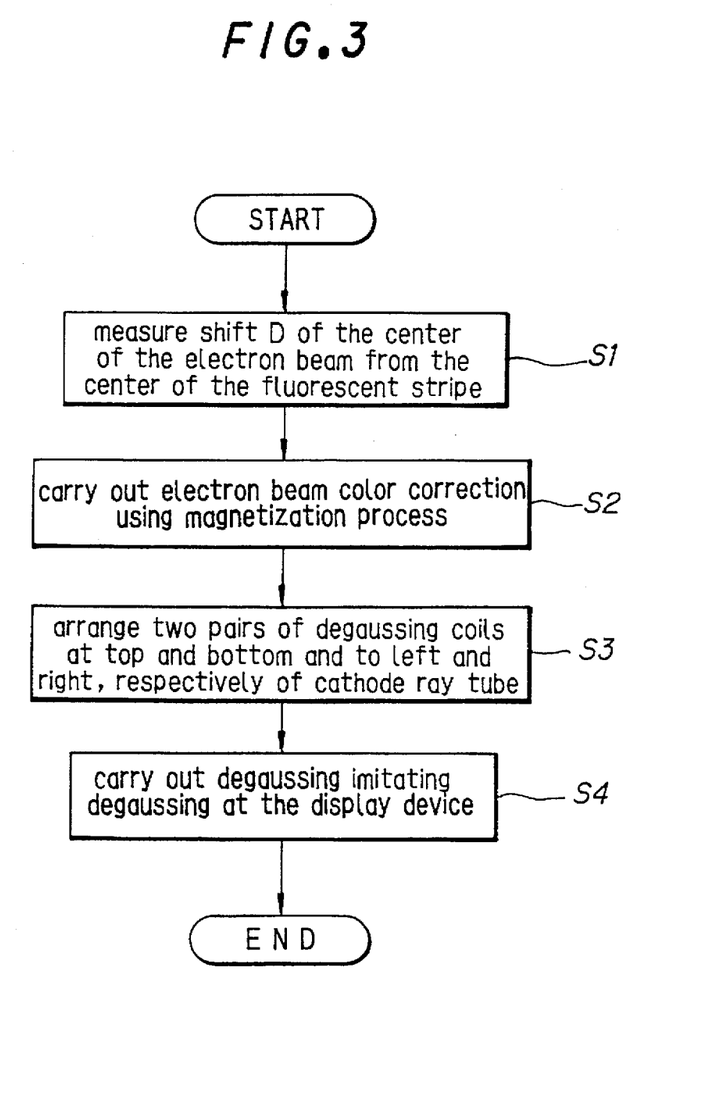
FIG. 3 is a flowchart showing a degaussing process according to the present invention.

In the following, the degaussing method of the present invention is described in accordance with the flowchart of FIG. 3 showing a procedure including the aforementioned magnetization process.

Figure 4:
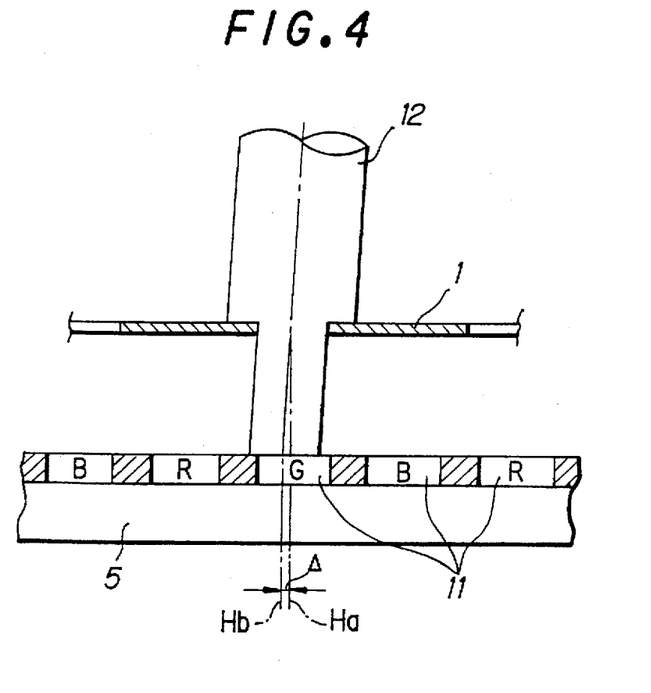
FIG. 4 is a diagram illustrating the shift Δ of the center of the electron beam from the center of the stripe of the fluorescent material.

First, a shift Δ of the center Hb of an electron beam 12 from the center Ha of a fluorescent stripe 11 shown in FIG. 4 is measured (step S1) in order to carry out impaired color purity correction for the electron beam by the magnetization process. In measuring this shift Δ, brightness of a monochromatic green fluorescent stripe is measured with a photosensor while moving an electron beam across the green fluorescent stripe. The shift Δ is then obtained from the amount of deviation of the electron beam 12 when the brightness is at a maximum, i.e. when the center of the electron beam Hb is positioned at the center Ha of the green fluorescent stripe.

Figure 5:
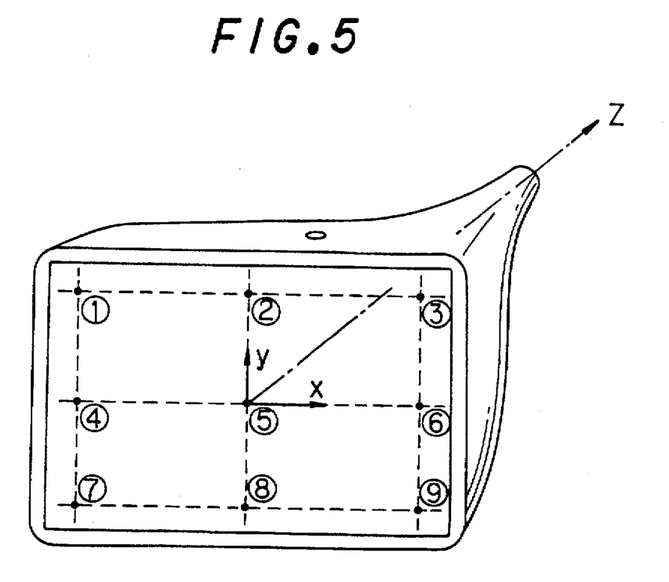
FIG. 5 is a view illustrating the measurement points of the shift Δ.

The measurement is carried out at three different levels in the horizontal direction and three different levels in the vertical direction, giving a total of nine points, as shown in FIG. 5. The position of the end points is taken as 90% of the picture size. In this embodiment, evaluations are carried out at the four points at the corners, points 1, 3, 7 and 9 of FIG. 5. With regards to the data at the corners, the shift Δ of the center of the electron beam from the center of the fluorescent stripe is evaluated for the points 1, 3, 7 and 9 of FIG. 5 using D1'=D1–D4, D3'=D3–D6, D7'=D7–D4, D9'=D9–D6 taking the point at either end of the x axis as a reference, in order to avoid the influence of positional variation in setting the deviation yoke.

Figure 6:
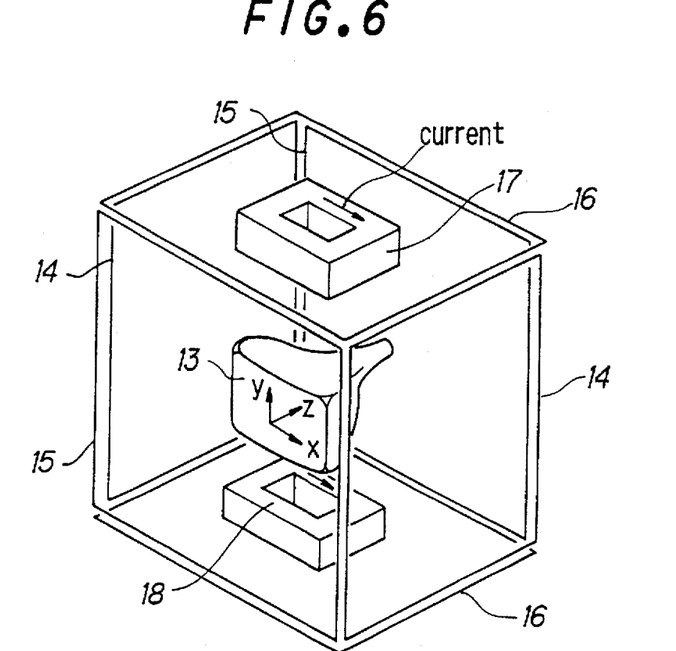
FIG. 6 is a perspective view showing an example of a structure of a magnetizing device used in a magnetizing process.

After the shift Δ of the center of the electron beam from the center of the fluorescent stripe is measured, impaired color purity correction based on this shift Δ is carried out at step S2 for the electron beam using the magnetization process. This color-shift correction is carried out by magnetizing magnetic materials, such as the color discriminating electrode 4 and internal magnetic shield 9 within the cathode ray tube 13 by applying a superimposed magnetic field with a d.c. biased magnetic field and a strong attenuating alternating magnetic field. An example of the structure of a magnetizing device for carrying out this magnetization is shown in FIG. 6. In FIG. 6, in order to generate a d.c. biased magnetic field, three pairs of coils 14, 15 and 16 are used which are respectively arranged coaxially in the directions of x, y and z axis around the cathode ray tube 13. Further, in order to generate an attenuating alternating magnetic field, two coils 17 and 18 are arranged coaxially in the direction of the y axis of the cathode ray tube 13.

In this embodiment, the cathode ray tube 13 used is of a 17 model, a conventional 17 inch size. The magnetomotive force due to the coils generating the attenuating alternating magnetic field is taken to be 1000 KA·turns at a maximum and the spacing of each of the coil pairs 14, 15 and 16 is taken to be 700 mm. Then, after a current is applied to, for example, the coil pair 15 for d.c. biased magnetic field generation to generate a d.c. biased magnetic field with a magnetic flux density of 300 µT in the direction of the z-axis in FIG. 6, an attenuating alternating magnetic field is superimposed with the d.c. biased magnetic field by having a current flowing through the two coils 17 and 18 for attenuating alternating magnetic field generation and the magnetic material within the cathode ray tube 13 is magnetized. The magnetomotive force due to the coils generating the d.c. biased magnetic field and the attenuating alternating magnetic field is decided on the basis of the amount of obtained shift Δ of the center of the electron beam from the center of the fluorescent stripe with inclusion of anticipated amount of degaussing at the display device in which the completed cathode ray tube is incorporated.

In the above way, impaired color purity correction of electron beam using a magnetization process is carried out.

Figure 7:
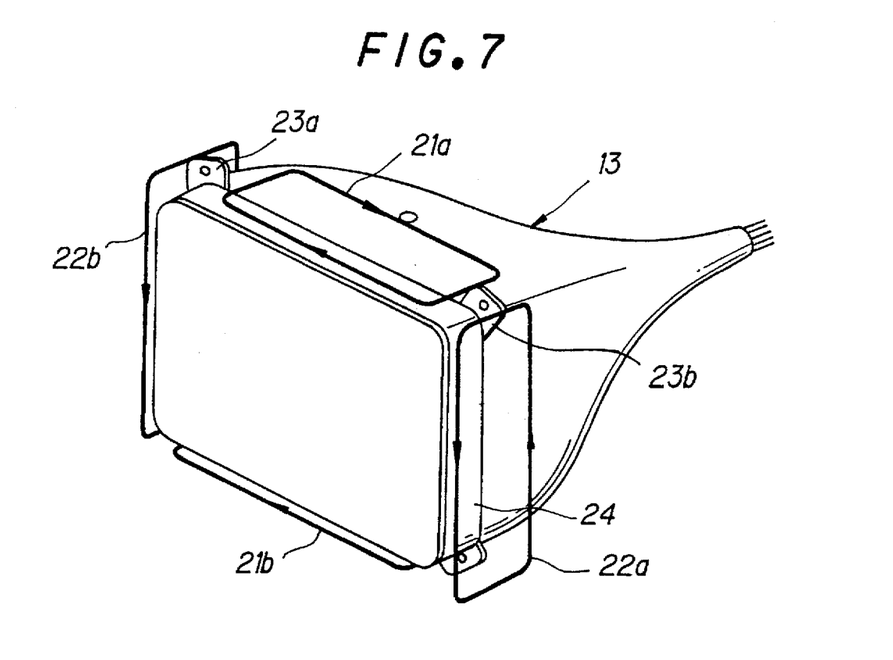
FIG. 7 is a perspective view showing an example of an arrangement of two pairs of degaussing coils, with one located at the upper and lower, and the other to the left and right of a cathode ray tube.

When impaired color purity correction of the electron beam using this magnetization process is finished, two pairs of degaussing coils 21a and 21b, and 22a and 22b are provided at step S3, the one pair located at the top and bottom and the other to the left and right of the cathode ray tube 13 as shown in FIG. 7. Degaussing with an imitated magnetic field for the degaussing at the display device into which the completed cathode ray tube is incorporated is then carried out using the degaussing coils 21a and 21b and 22a and 22b at step S4.

As an example, the pair of degaussing coils at the upper and lower 21a and 21b have an outer coil size of 300 mm×150 mm and are provided between mounting plates 23a and 23b of the cathode ray tube 13 with one side being flush with the tube surface in the z direction and apart from an explosion-proofing band 24 by about 10 mm. Further, the magnetomotive force due to the degaussing coils 21a and 21b is taken to be 800 A·turns. On the other hand, the pair of coils to the left and right 22a and 22b are apart from the explosion-proofing band 24 by about 20 mm and are arranged in such a manner that the coil centers coincide with the center of a side of the explosion proofing band 24. The magnetomotive force due to the degaussing coils 22a and 22b is 1000 A·turns.

The magnetomotive forces due to the degaussing coils 21a and 21b and the magnetomotive forces due to the degaussing coils 22a and 22b are decided on the basis of the amount of degaussing at the display device into which the completed cathode ray tube is incorporated. This amount of degaussing can be measured beforehand by a well known method for the display device into which the cathode ray tube is to be incorporated. Further, the magnetomotive forces due to the pairs of degaussing coils 21a and 21b, and 22a and 22b are decided by the number of windings and current flowing through each of the coils. The directions of the arrows in FIG. 7 show the direction of current flow.

With regards to this degaussing, the magnetic field generated by the pair of the upper and lower degaussing coils 21a and 21b is in the vertical direction of the cathode ray tube 13 and therefore degausses mainly the aperture grill 1 and the AG frame B member 3 of the color selection electrode 4 within the cathode ray tube 13. The magnetic field generated by the pair of the right and left degaussing coils 22a and 22b is in the horizontal direction of the cathode ray tube 13 and therefore mainly degausses the AG frame A member 2 of the color selection electrode 4 and the internal magnetic shield 9 (refer to FIG. 2) within the funnel 7.

During this degaussing, for example, degaussing is first carried out using the left and right degaussing coils 22a and 22b, after which degaussing is carried out by the upper and lower degaussing coils 21a and 21b, with there being the condition that this degaussing is not to be carried out at the same time. The reason for this is that at the degaussing coils 21a, 21b, 22a and 22b, the distance between neighboring different pairs of coils is less than the distance between paired coils and magnetic fields other than those for degaussing are therefore generated between the neighboring coils of different pairs to render the desired degaussing impossible if degaussing is carried out at the same time by the pairs of the degaussing coils 21a and 21b, and 22 and 22b. Of course, it is also possible for the degaussing to be carried out in the reverse sequence, i.e. for degaussing to be carried out by the right and left degaussing coils 22a and 22b after the degaussing has been carried out by the upper and lower degaussing coils 21a and 21b.

Figure 8A:
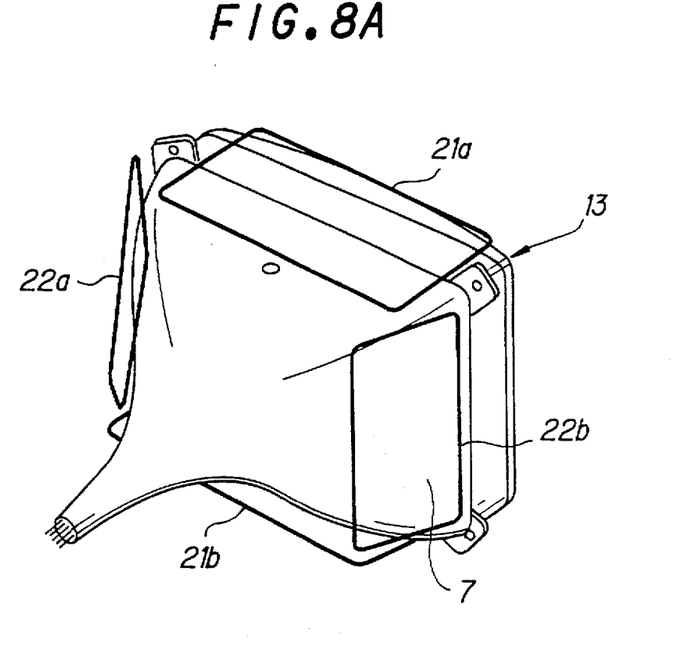
FIG. 8A and FIG. 8B are views showing a further example of an arrangement of the two pairs of degaussing coils with one located at the upper and lower, and the other to the left and right of the cathode ray tube, where
Figure 8B:
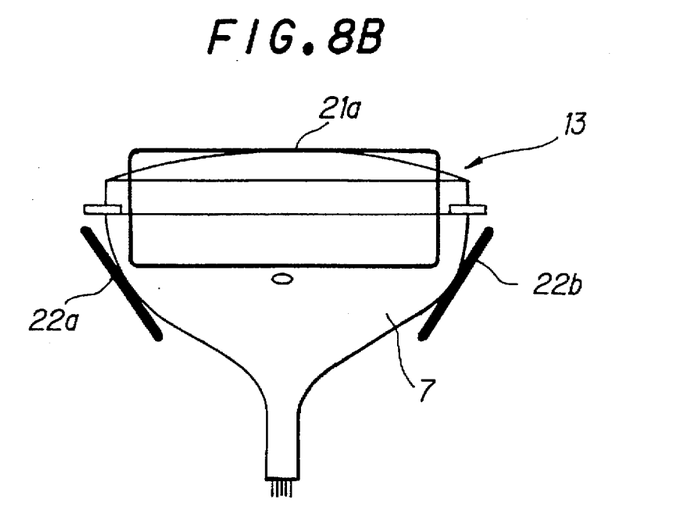

In the above embodiment, the pair of the right and left coils 22a and 22b has been arranged so that the centers of the coils coincide with the center of the side of the explosion-proofing band 24 but they can also be arranged so as to be along the funnel 7 at the rear side of the cathode ray tube 13, as shown in FIG. 8A and FIG. 8B. By this way, the degaussing coils 22a and 22b become closer to the internal magnetic shield 9 within the funnel 7 and a sufficient amount of magnetic flux is obtained in the internal magnetic shield 9 in the magnetic fields generated by the degaussing coils 22a and 22b. Degaussing of the internal magnetic shield 9 is therefore carried out in a more effective manner.

Here, shifts Δ of the electron beams, whose impaired color purity had been corrected using a magnetization process, are shown in Table 1 with regards to the cases where: (1) degaussing was not carried out, (2) degaussing was carried out using three degaussing rods in the way described in the related art at a shifting speed of 50 cm/second in the direction of the x-axis, (3) degaussing was carried out using two pairs of degaussing coils 21a and 21b, 22a and 22b arranged with one pair located at the top and bottom and the other to the right and left of the cathode ray tube 13, and (4) a pair of degaussing coils 22a and 22b located to the right and left were arranged along the funnel 7 and degaussing was carried out using the pair of coils 21a and 21b located at the upper and lower, and the pair of coils 22a and 22b to the left and right; for which the degaussing occurring after incorporation of the cathode ray tube in the display device and at the time of its adjustment was imitated by manually rotating the degaussing rods and the degaussing using the degaussing device built into the display device was then carried out.

TABLE 1

|  | degaussing method | shift (μm) |
| --- | --- | --- |
| Related example | (1) | 20 |
|  | (2) | 9 |
| Present invention | (3) | 3 |
|  | (4) | 2 |

In Table 1, the electron beam shift Δ is the amount of change for which the shift after degaussing due to the degaussing device built into the device and degaussing at the manufacturing and adjusting processes for the display device is taken as a reference. This is the average of such shifts obtained at the four corners (Δ1', Δ3', Δ7' and Δ9') of FIG. 5. As becomes clear from Table 1, the corrected trajectory of the cathode rays due to magnetization in magnetization processes is not easily changed by carrying out degaussing after the impaired color purity correction of the electron beam with two pairs of degaussing coils 21a and 21b, and 22a and 22b respectively arranged at the top and bottom and to the left and right of the cathode ray tube 13. In other words, changes caused by degaussing due to the degaussing device built-into the display device and degaussing at the manufacturing and adjustment processes of the display device can be made to be small.

According to the present invention, after impaired color purity correction of electron beams has been carried out for the cathode ray tube 13 using a magnetization process with inclusion of anticipated amount of degaussing when the cathode ray tube is incorporated in a display device, two pairs of degaussing coils are arranged with the one located at the top and bottom and the other to the right and left of the cathode ray tube 13. The degaussing of a magnetic material within the cathode ray tube 13 is then carried out with the above anticipated amount using the degaussing coils. In this way, a color cathode ray tube can be provided with no impaired color purity because the cathode ray trajectories corrected by magnetization in the magnetization process is not easily changed during use after incorporation in the display device.

What is claimed is:

1. A method of degaussing a cathode ray tube during manufacturing thereof, comprising the steps of:
   measuring a shift in an electron beam from a desired position of the electron beam in the cathode ray tube;
   applying a first magnetic field to the cathode ray tube to compensate for the shift and to place the electron beam at the desired position in the cathode ray tube;

detecting an anticipated amount of degaussing for said cathode ray tube when said cathode ray tube is incorporated in a display device;

arranging two pairs of degaussing coils with a first pair located at a top and a bottom and a second pair to the right and left of said cathode ray tube; and degaussing said cathode ray tube by applying a second magnetic field to the cathode ray tube with the two pairs of degaussing coils;

wherein the second magnetic field is for offsetting said anticipated amount of degaussing occurring when the cathode ray tube is incorporated into the display device.

2. The method of degaussing the cathode ray tube according to claim 1, wherein said second pair of degaussing coils located to the right and left of said cathode ray tube is provided along a funnel at a rear side of said cathode ray tube.

3. The method of degaussing the cathode ray tube according to claim 1, wherein degaussing is carried out first by using one pair of said two pairs of degaussing coils and thereafter by using the other pair of said two pairs of degaussing coils.

4. The method of degaussing the cathode ray tube according to claim 1, wherein said second pair of degaussing coils located to the right and left of said cathode ray tube is provided near a front panel of the cathode ray tube.

5. The method of degaussing the cathode ray tube according to claim 1, wherein the step of measuring the shift in the electron beam comprises a step of measuring the shift in the electron beam at a plurality of locations along the cathode ray tube.

6. The method of degaussing the cathode ray tube according to claim 1, wherein the step of applying the first magnetic field comprises a step of applying a DC biased magnetic field and an attenuating alternating magnetic field to the cathode ray tube.

7. The method of degaussing the cathode ray tube according to claim 1, wherein the step of degaussing the cathode ray tube by applying the second magnetic field comprises a step of generating a magnetomotive force of 800 A-turns in the first pair of degaussing coils located at the top and bottom of the cathode ray tube.

8. The method of degaussing the cathode ray tube according to claim 1, wherein the step of degaussing the cathode ray tube by applying the second magnetic field comprises a step of generating a magnetomotive force of 1000 A-turns in the second pair of degaussing coils located to the left and right of the cathode ray tube.

* * * * *